United States Patent [19]

Miyamoto et al.

[11] Patent Number: 5,318,655

[45] Date of Patent: Jun. 7, 1994

[54] TREAD CENTERING DEVICE

[75] Inventors: Yoshinori Miyamoto; Hidemasa Sato; Jiro Agawa, all of Nagasaki; Toru Aihara, Hiratsuka; Keizo Yamashita, Hiratsuka; Kazuo Mogi, Hiratsuka, all of Japan

[73] Assignees: Mitsubishi Jukogyo Kabushiki Kaisha; The Yokohama Rubber Co., Ltd., both of Tokyo, Japan; a part interest

[21] Appl. No.: 79,815

[22] Filed: Jun. 22, 1993

[30] Foreign Application Priority Data

Jun. 24, 1992 [JP] Japan .................................. 4-166125

[51] Int. Cl.⁵ .............................................. B29D 30/30
[52] U.S. Cl. ................................. 156/351; 156/405.1; 156/128.1; 226/15; 271/253
[58] Field of Search .................. 156/405.1, 406.4, 123, 156/128.1, 128.6, 129, 351; 226/15, 17, 18-20; 271/226, 253-255

[56] References Cited

U.S. PATENT DOCUMENTS

| | | | |
|---|---|---|---|
| 2,961,548 | 11/1960 | Prell | 226/20 |
| 3,026,230 | 3/1962 | Nebout | 156/406.4 |
| 4,359,675 | 11/1982 | Miller, III | 318/603 |
| 4,820,373 | 4/1989 | Klose | 156/405.1 |
| 4,848,632 | 7/1989 | Mack et al. | 226/18 |

FOREIGN PATENT DOCUMENTS

| | | |
|---|---|---|
| 0104339 | 4/1984 | European Pat. Off. |
| 0376357 | 7/1990 | European Pat. Off. |
| 0490599 | 6/1992 | European Pat. Off. |
| 973972 | 11/1964 | United Kingdom |

Primary Examiner—Geoffrey L. Knable
Attorney, Agent, or Firm—Jacobson, Price, Holman & Stern

[57] ABSTRACT

An object of the present invention is to provide a tread centering device which automatically detects the position of tread center and holds it in a straight form even when the center of tread is not positioned in a straight form. The device mainly comprises a plurality of detectors for detecting a groove for centering the tread, a holding plate which is inserted into the detected groove, and a mechanism which moves said holding plate transversely to align said groove in a straight form.

1 Claim, 3 Drawing Sheets

TREAD CENTERING DEVICE

FIELD OF THE INVENTION AND RELATED ART STATEMENT

The present invention relates to a tread centering device for a tread stick device used in a tire building apparatus.

So far, for centering a tread on a tread stick device, an operator has performed the operation of setting a tread groove to a guide roller or the like.

This prior art has the following problem: Since the center of tread is not always positioned in a straight form when the tread is supplied to a tire building machine, it is required to correct the center of tread into a straight form.

OBJECT AND SUMMARY OF THE INVENTION

An object of the present invention is to provide a tread centering device which automatically detects the position of tread center and holds it in a straight form even when the center of tread is not positioned in a straight form.

To achieve the above object, the present invention is configurated as described below.

A tread centering device for a tread which is used in a tire building apparatus and is provided with a groove or a protrusion for guiding has a plurality of centering mechanisms each of which comprises:

a guide position detector for detecting the position of the groove or protrusion;

a holding plate which moves together with the guide position detector and whose tip end fits to the groove or protrusion;

holding plate driving means for moving the holding plate vertically;

centering unit driving means for moving the holding plate and holding plate driving means via a drive shaft in the transverse direction;

a centering position detector and a waiting position detector for detecting the centering position and the waiting position of the drive shaft, respectively; and controlling means wherein,
  (i) when the signal from the waiting position detector is inputted, the controller drives the centering unit driving means according to the command signal, so that the tip end of the holding plate is positioned just under the groove or protrusion according to the signal from the guide position detector,
  (ii) the controller drives the holding plate driving means to fit the tip end of the holding plate to the groove or protrusion, and
  (iii) the controller then drives the centering unit driving means so that the tip end of the holding plate is located at the centering position according to the signal from the centering position detector, wherein the centering mechanisms are arranged in line longitudinally so that the groove or protrusion is aligned and held in a straight form longitudinally.

When a groove or protrusion for guiding is formed on the tread, the groove or protrusion is detected and held by a device. A plurality of such devices are installed at appropriate intervals throughout the total length of the tread so that each device holds the groove or protrusion and then the devices align and hold the groove or protrusion in a straight form.

The operation of the present invention will be described below.

When a tread is placed on the centering device, the centering unit of the centering device begins to move from its waiting position. When a groove detector, for instance, detects the shoulder of the groove of the tread, the centering unit stops once and drives the holding plate to insert it into the groove, thereby the tread being held. Then, the centering unit again begins to move and stops at the centering position. When all centering units stop at the centering position, the holding plate is placed in a straight form, thereby the tread being straightened. When the groove is formed at the center of tread, the position of the holding plate is at the center of the tread. When the groove is away from the center of tread, the position of tread center can be determined from the offset amount. These operations are controlled by a controller.

The tread centering device in accordance with the present invention mainly comprises a plurality of detectors for detecting the groove or protrusion for centering the tread, a holding plate which is fitted into the detected groove or protrusion, and a mechanism for moving the holding plate transversely and aligning it in a straight form, by which the device achieves the following effect.

When a tread lies on a truck or when a tread is taken from a truck, the tread is often not in a straight form. Therefore, if the tread is supplied to a tread stick device without being straightened, the operator must fit the groove or protrusion to a centering guide. According to the present invention, however, the tread can be straightened automatically and the position of the center can be determined. Therefore, the tread can be moved onto the tread stick device with the tread groove or protrusion fitting to the guide of the tread stick device while the tread is held in a straight form by means of a publicly known transfer device. As a result, there is no need for centering operation performed by the operator, and it is possible to automate the operation. Also, an error of centering caused by the operator can be avoided.

DETAILED DESCRIPTION OF A PREFERRED EMBODIMENT

An embodiment of the present invention will be described below with reference to FIGS. 1 through 5.

Figure 1:
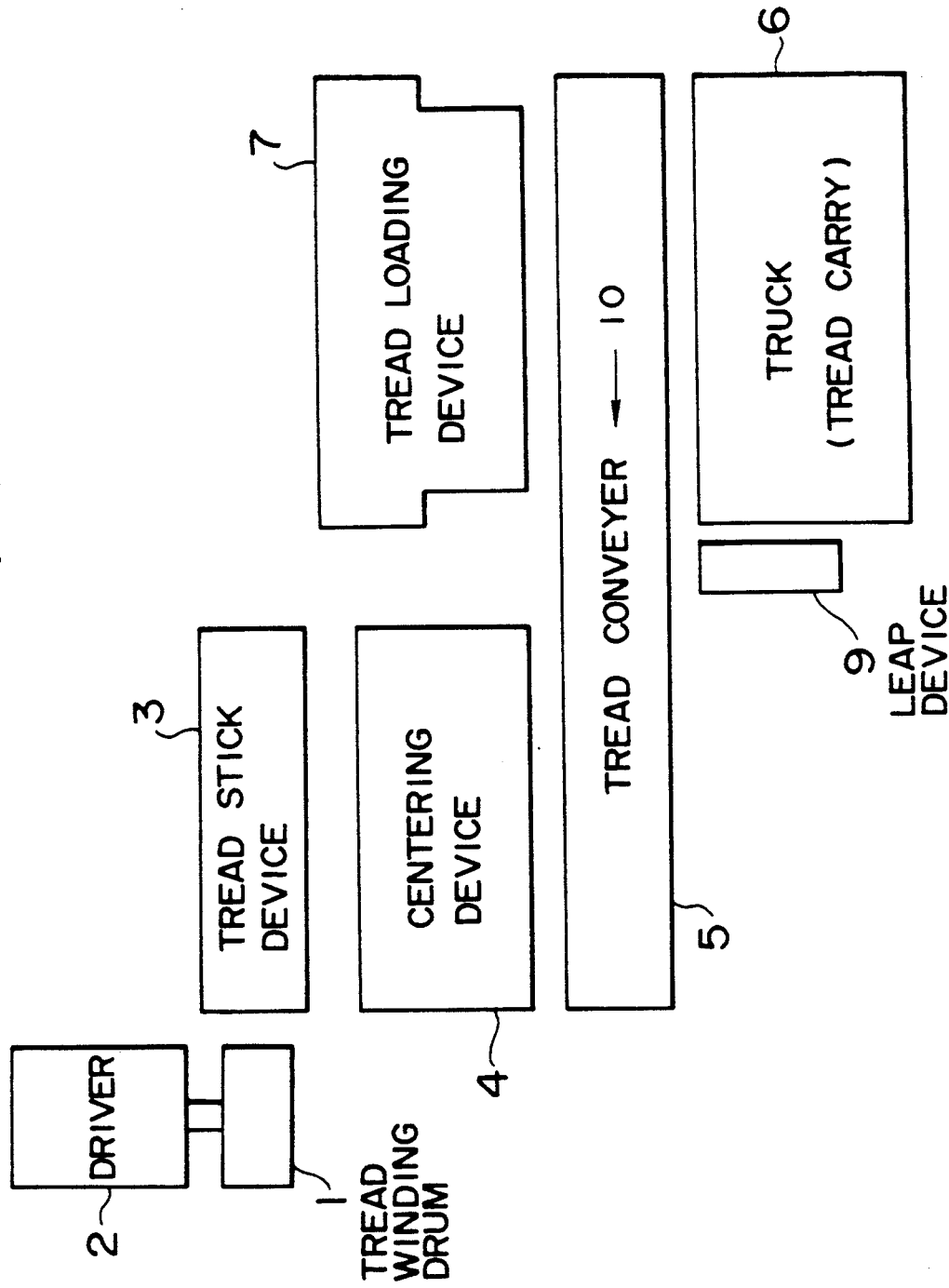
FIG. 1 is a plan view showing the general arrangement of a tire building apparatus having a centering device of the present invention.

FIG. 1 shows the general arrangement of a tire building apparatus, in which reference numeral 1 denotes a tread winding drum, 2 denotes a driver for the tread winding drum, 3 denotes a tread stick device, 4 denotes a centering device, and 5 denotes a tread conveyor. A truck 6, called a tread carry, carries a plurality of treads cut into a length of one piece on each of multistage racks. A leap device 9 raises the racks of the truck 6 one by one. A tread loading device 7 takes the treads one after another from the truck 6 and puts them on the tread conveyor 5. The tread put on the tread conveyor 5 is moved in the direction of arrow 10 to the side of the centering device 4.

The tread is moved onto the centering device 4 using a publicly known means (not shown). The tread is accurately positioned in the transverse direction particularly with its center being positioned in a straight form on the centering device 4. The tread is then placed on the tread stick device 3 using a publicly known means (not shown) so that its center is positioned at the center of the tread stick device 3. The tread winding drum 1, the driver 2, the tread stick device 3, the tread conveyor 5, the truck 6, the leap device 9, and the tread loading device 7 are publicly known; therefore, the description of their details is omitted.

Figure 2:
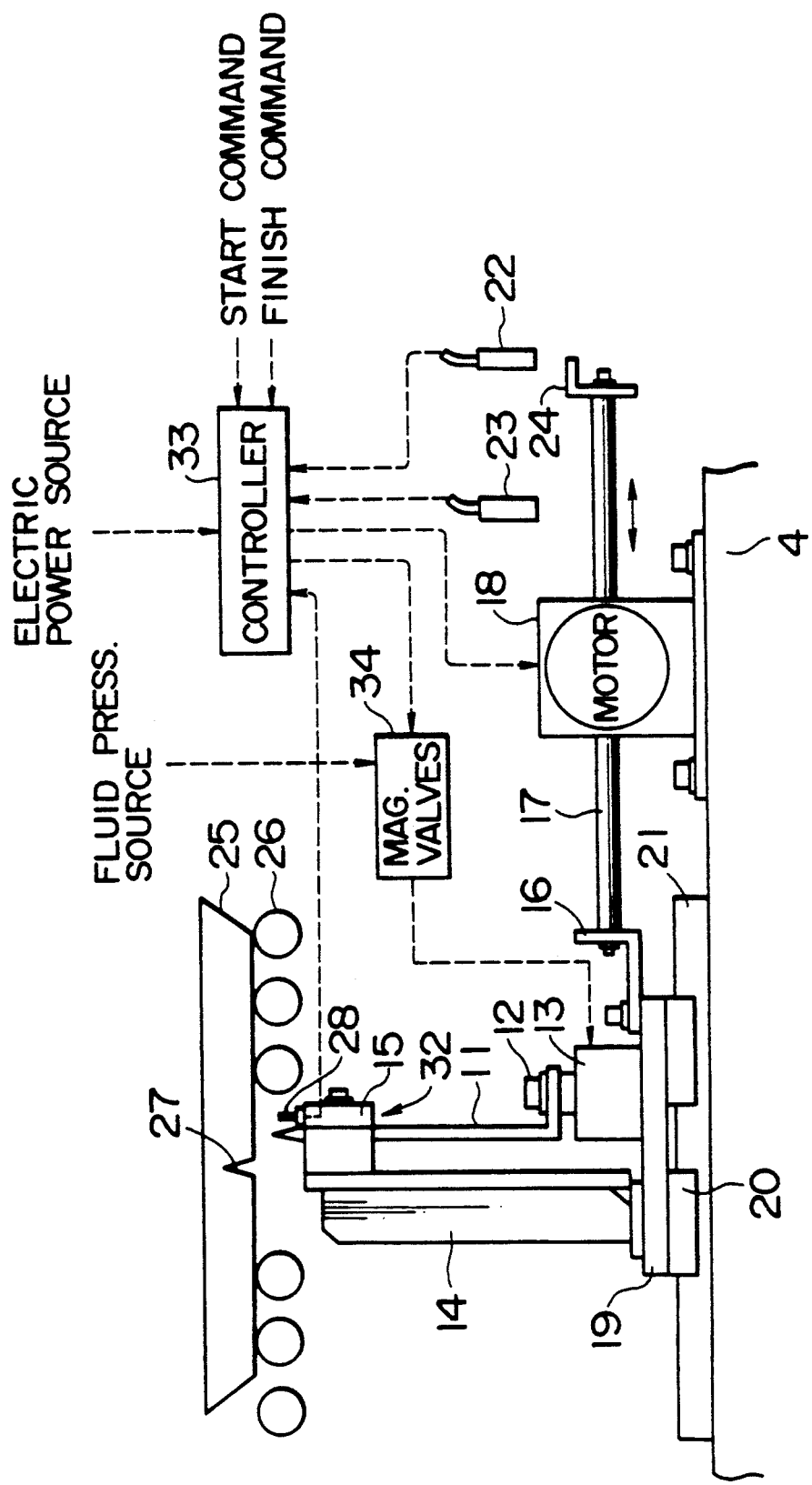
FIG. 2 is a front view showing the configuration of an embodiment of the present invention.

FIG. 2 shows a tread centering device 4. The tread 25 is supported on rollers 26 so that it can be moved transversely (right and left in the figure). The tread 25 has a groove 27 formed in the longitudinal direction at the center of the tread or at a certain distance away from the tread center. By aligning this groove 27, the tread can be positioned in a straight form. A holding plate 11 having a tip end of a shape fitting to the groove 27 is slidably supported by a guide block 15, which is fixed to a base 19 via a bracket 14. The holding plate 11, which can be moved only vertically, is connected to a fluid pressure cylinder 13 which is driven vertically. The base 19 is supported by rails 21 via bearings 20 so as to be moved on the rails 21 transversely (right and left in the figure). The base 19 is also connected to one end of a drive shaft 17 of a linear drive motor 18 via a bracket 16. The drive shaft 17 has a detection member 24 at its end opposite to the bracket 16 so that the position can be detected by means of a waiting position detector 22 and a centering position detector 23.

The controller 33 starts the operation according to the start command signal, and drives or stops the linear drive motor 18 according to the signal from the position detectors 22 and 23. Also, the controller 33 drives the fluid pressure cylinder 13 upward and downward via a magnetic valve group 34 according to the signal from a later-mentioned groove detector 28 and the finish command signal, respectively.

Figure 3:
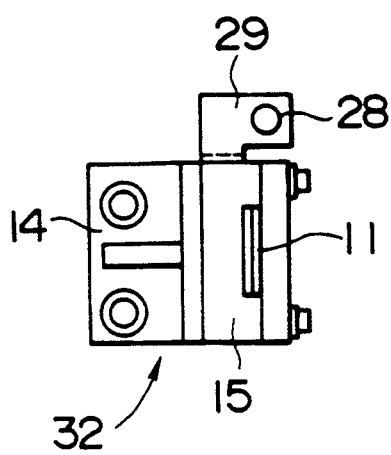
FIG. 3 is a plan view of a centering unit shown in FIG. 2.
Figure 4:
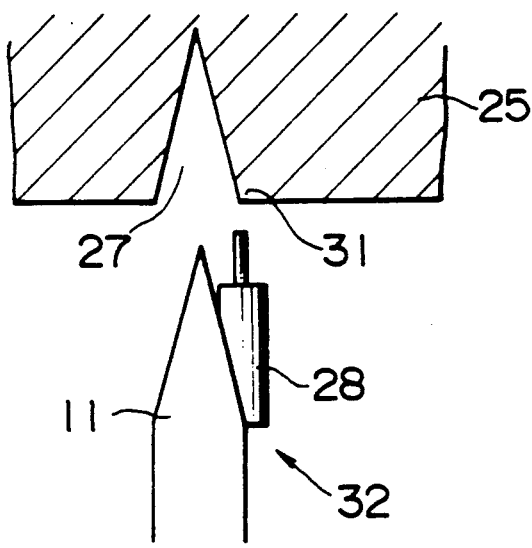
FIG. 4 is a view showing the positional relationship of a holding plate and a groove detector with a tread groove.

FIG. 3 is a plan view of a guide block 15. As shown in the figure, a groove detector 28, which detects the shoulder 31 of the groove 27 of the tread 25, is fixed to the guide block 15 via a bracket 29, constituting a centering unit 32 together with the holding plate 11. Any of the aforesaid detectors is a publicly known device such as a proximity switch or a photoelectric switch. A positional relationship exists such that the holding plate 11 is positioned just under the groove 27 when the groove detector 28 comes to the position where the shoulder 31 of the groove 27 of the tread 25 is detected as shown in FIG. 4.

The centering unit 32, the fluid pressure cylinder 13, the base 19, the rails 21, the drive shaft 17, the linear drive motor 18, the waiting position detector 22, the centering position detector 23, and the controller 33 constitute a centering mechanism.

Figure 5:
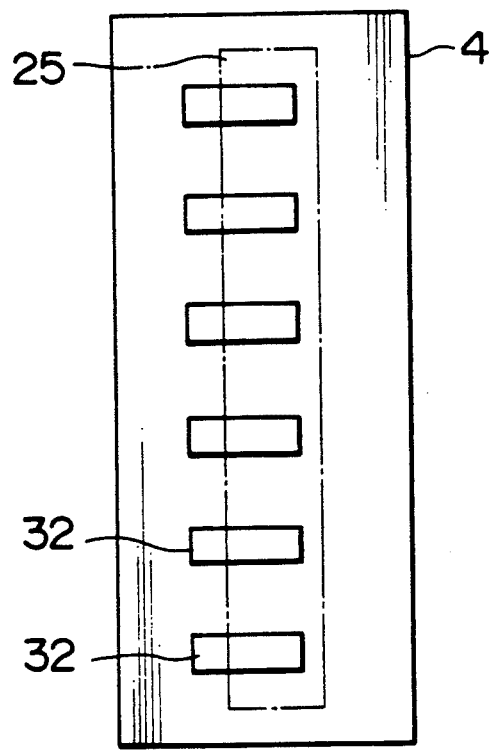
FIG. 5 is a view showing an arrangement of a plurality of centering units on a centering device.

A plurality of such centering mechanisms including the centering unit 32 are arranged on the centering device 4 in the longitudinal direction of the tread as shown in FIG. 5.

Next, the operation of the centering mechanism will be described.

In the case where the centering mechanism is in the waiting condition as shown in FIG. 2, that is, where the signal from the waiting position detector 22 is inputted into the controller 33, when the operator or not shown a main controller inputs the start command signal into the controller 33, the controller 33 drives the base 19 by means of the linear drive motor to the left in the figure, and stops it when the tip end of the holding plate 11 is positioned under the groove 27 of the tread 25 according to the detection signal from the groove detector 28.

Then, the controller 33 energizes the magnetic valves 34, so that the piston of the fluid pressure cylinder 13 is driven upward by the external fluid pressure, thereby the tip end of the holding plate 11 being inserted or fitted into the groove 27 of the tread 25.

After that, the controller 33 drives the base 19 again by means of the linear drive motor to the left or the right (the drive direction is determined, for example, by whether the detection member 24 installed at the end of the drive shaft 17 first passed through the centering position detector 23 after it moved from the waiting position), and stops the base 19 with the tip end of the holding plate 11 being located at the centering position according to the signal from the centering position detector 23.

When the operator inputs the finish command signal into the controller 33, the controller 33 deenergizes the magnetic valves 34, so that the piston of the fluid pressure cylinder 13 is driven downward by the external fluid pressure. Then, the base 19 is moved to the right in the figure by means of the linear drive motor 18, and stopped at the waiting position according to the signal from the waiting position detector 22.

In FIG. 5, the tip end of the holding plate 11 is positioned in a straight form when all centering units 32 are at the positions detected by the centering position detector 23.

Although the centering unit 32 is installed on the centering device 4 in this embodiment, it may be installed on the tread conveyor 5. Also, although a groove 27 is formed in the tread 25 in this embodiment, a protrusion may be installed on the tread 25 in place of the groove 27 if the tip end of the holding plate 11 is of a shape suitable for fitting to the protrusion.

We claim:

1. A tread centering device for a tread which is used in a tire building apparatus and is provided with a groove or a protrusion in the longitudinal direction for guiding, having a plurality of centering mechanisms each of which comprises;

a guide position detector for detecting the position of said groove or protrusion;

a holding plate which moves in a transverse direction relative to the tread being centered together with said guide position detector and whose tip end fits to said groove or protrusion;

holding plate driving means for moving said holding plate in a direction towards the tread being centered;

centering unit driving means for moving said holding plate and holding plate driving means via a drive shaft in the transverse direction;

a centering position detector and a waiting position detector for detecting the centering position and the waiting position of said drive shaft, respectively; and controlling means wherein, (i) when the signal from said waiting position detector is inputted, said controlling means drives said centering unit driving means responsive to a start command signal, so that the tip end of said holding plate is positioned just under said groove or protrusion according to the signal from said guide position detector, (ii) said controlling means drives said holding plate driving means to fit the tip end of said holding plate to said groove or protrusion, and (iii) said controlling means then drives said centering unit driving means so that the tip end of said holding plate is located at the centering position according to the signal from said centering position detector, wherein said centering mechanisms are arranged in line longitudinally so that said groove or protrusion is aligned and held in a straight form longitudinally.

* * * * *